(12) United States Patent
Mukherjee et al.

(10) Patent No.: US 12,025,092 B2
(45) Date of Patent: Jul. 2, 2024

(54) WIND TURBINE BLADE AND METHOD FOR PRODUCING A WIND TURBINE BLADE

(71) Applicants: BLADE DYNAMICS LIMITED, Eastleigh Hampshire (GB); LM WIND POWER A/S, Kolding (DK)

(72) Inventors: Manish Mukherjee, Eastleigh Hampshire (GB); Michael Wenani Nielsen, Kolding (DK); Michael Lund-Laverick, Kolding (DK)

(73) Assignees: BLADE DYNAMICS LIMITED, Eastleigh Hampshire (GB); LM WIND POWER A/S, Kolding (DK)

( * ) Notice: Subject to any disclaimer, the term of this patent is extended or adjusted under 35 U.S.C. 154(b) by 218 days.

(21) Appl. No.: 17/605,909

(22) PCT Filed: Apr. 24, 2020

(86) PCT No.: PCT/EP2020/061504
§ 371 (c)(1),
(2) Date: Oct. 22, 2021

(87) PCT Pub. No.: WO2020/216927
PCT Pub. Date: Oct. 29, 2020

(65) Prior Publication Data
US 2022/0178347 A1 Jun. 9, 2022

(30) Foreign Application Priority Data
Apr. 26, 2019 (GB) ...................................... 1905852

(51) Int. Cl.
*F03D 1/06* (2006.01)
*B29D 99/00* (2010.01)

(52) U.S. Cl.
CPC ....... *F03D 1/0675* (2013.01); *B29D 99/0028* (2013.01); *F03D 1/0633* (2013.01); *F05B 2230/23* (2013.01)

(58) Field of Classification Search
CPC ...... F03D 1/0675; F03D 1/069; F03D 1/0633; F03D 1/0645
See application file for complete search history.

(56) References Cited

U.S. PATENT DOCUMENTS

2010/0143143 A1 6/2010 Judge
2011/0211969 A1 9/2011 Nies
(Continued)

FOREIGN PATENT DOCUMENTS

EP 2341241 A1 7/2011
EP 3 488 100 A1 1/2018
(Continued)

OTHER PUBLICATIONS

Search Report dated Oct. 15, 2019 issued in corresponding Great Britain Application No. 1905852.8.
(Continued)

*Primary Examiner* — Justin D Seabe
*Assistant Examiner* — John S Hunter, Jr.
(74) *Attorney, Agent, or Firm* — Nath, Goldberg & Meyer; Jerald L. Meyer; Tanya E. Harkins

(57) ABSTRACT

Disclosed is a wind turbine blade and a method for its manufacture. The wind turbine blade comprises an upwind side shell part, a downwind side shell part, a leading edge and a trailing edge. A flatback web is arranged at the trailing edge, which couples the upwind side shell part with the downwind side shell part, wherein the flatback web comprises at least one U-shaped end section with a recess, into
(Continued)

which the upwind side shell part and/or the downwind side shell part is inserted and bonded to the U-shaped end section by an adhesive.

15 Claims, 10 Drawing Sheets

(56) References Cited

U.S. PATENT DOCUMENTS

| | | |
|---|---|---|
| 2013/0239379 A1 | 9/2013 | Rajasingam et al. |
| 2014/0227100 A1 | 8/2014 | Godichon et al. |
| 2019/0291365 A1 | 9/2019 | Roberts et al. |

FOREIGN PATENT DOCUMENTS

| | | |
|---|---|---|
| WO | 2014/108240 A1 | 7/2014 |
| WO | 2016/189051 A1 | 12/2016 |

OTHER PUBLICATIONS

Search Report dated Jul. 13, 2020 issued in corresponding International Application No. PCT/EP2020/061504.

WIND TURBINE BLADE AND METHOD FOR PRODUCING A WIND TURBINE BLADE

This is a National Phase Application filed under 35 U.S.C. 371 as a national stage of PCT/EP2020/061504, filed Apr. 24, 2020, an application claiming the benefit of Great Britain Application No. 1905852.8, filed Apr. 26, 2019, the content of each of which is hereby incorporated by reference in its entirety.

The present invention relates to a wind turbine blade and to a method of its production. The wind turbine blade comprises an upwind side part and a downwind side part which are bonded along at least one joint. The profile of the wind turbine blade is embodied as a flatback profile.

BACKGROUND

As wind turbines and wind turbine blades increase in size, the blade loads, i.e. strains, bending moments, peel loads etc., in particular along the trailing edge, increase. For this and other reasons, the design of the trailing edge is an important factor for the efficiency of the wind turbine.

Wind turbine blades comprising a flatback profile at the trailing edge may have an increased efficiency. An optimized profile comprises a varying geometry of the trailing edge along the airfoil region of the blade. A rounded corner may be required in a flatback profile which is produced as an integral part of the shell parts. This is disadvantageous for the aerodynamic properties.

Document EP 2 341 241 A1 shows a wind turbine blade, wherein the trailing edge comprises a prefabricated panel. Due to the prefabricated panel, a flatted trailing edge with sharp corners can be provided.

However, it is also difficult to assemble a wind turbine blade which sustains high loads and which is scalable in geometry and strength.

In particular, it is may be challenging to provide a separate flatback web profile which forms, together with the shell parts, a structure which sustains high mechanical forces.

SUMMARY

It is an object of the present invention to provide a wind turbine blade with a flatback profile resulting in good aerodynamic properties and which sustains high loads.

It is another object of the present invention to provide an improved method of manufacturing a flatback wind turbine blade, which enables an accurate and efficient placement and adhesion of a flatback web in relation to other shell parts.

The object of the invention is achieved by a wind turbine blade and by a method of producing a wind turbine blade according to one or more of the claims presented herein.

Preferred embodiments of the invention are subject matter of the dependent claims, the description and the drawings.

The invention relates to a wind turbine blade, which comprises an upwind side shell part, a downwind side shell part, a leading edge and a trailing edge.

A wind turbine blade typically comprises a root region, an airfoil region with a tip, a pressure side, a suction side and a chord line extending between a leading edge and a trailing edge.

Each shell part typically comprises a core, e.g. a polymer foam, which is laminated with glass and/or carbon fibre layers which are embedded in a polymer resin. The core may not extend through the entire length of the wind turbine blade, in particular a tip end region may only comprise a fibre-reinforced laminate. The upwind side shell part is typically an upwind side shell half. The downwind side shell part is typically a downwind side shell half.

Each of the upwind side shell part and the downwind side shell part typically comprise a leading-edge end and a trailing-edge end, wherein usually the respective leading-edge ends are joined at the leading edge of the blade and the respective trailing-edge ends are joined at the trailing edge or the blade, the latter for example involving the use of a flatback web.

According to one aspect of the present invention, a flatback web is arranged at the trailing edge for coupling the upwind side shell part with the downwind side shell part along at least part of its length, wherein the flatback web comprises at least one U-shaped end section with a recess, into which at least part of the upwind side shell part and/or at least part of the downwind side shell part is inserted and bonded to the U-shaped end section, preferably by an adhesive.

Thus, in a preferred embodiment, the present invention relates to a wind turbine blade, comprising:
- an upwind side shell part,
- a downwind side shell part,
- a leading edge and a trailing edge, and
- a flatback web being arranged at the trailing edge, which couples the upwind side shell part with the downwind side shell part, wherein the flatback web comprises at least one U-shaped end section with a recess, into which at least part of the upwind side shell part and/or at least part of the downwind side shell part is inserted and bonded to the U-shaped end section.

As seen in the spanwise direction of the blade, the flatback web will usually extend from the root end, or from close to the root such as not further than 5 meters from root end in the spanwise direction, up to 40 meters, such as up to 30 meters. Thus, the flatback web preferably has a length of 5-50 meters, more preferably, 10-40 meters, most preferably 15-35 meters.

The flatback web will typically comprise a first U-shaped end section, such as an upper U-shaped end section, and an opposed second U-shaped end section, such as a lower end section, and a middle section extending between the first and second U-shaped end sections. The middle section will usually extend along substantially the entire height of the flatback web and/or substantially the entire height of the flatback trailing edge of the blade. As seen in a cross sectional view of the blade, the middle section will usually extend substantially vertically.

Accordingly, the flatback web preferably forms at least part of the geometry of the trailing edge of the blade. Furthermore, the flatback web connects the shell parts mechanically, in particular, the flatback web may be an integral part of the bearing structure.

Preferably, the flatback web comprises U-shaped end sections at both ends. In a preferred embodiment, the flatback web comprises a first U-shaped end section at a first end of the flatback web, for example at an upper end of the flatback web, and a second U-shaped end section at a second end of the flatback web, for example at a lower end of the flatback web.

By using a flatback web with U-shaped end sections, which are fastened, for example by gluing, onto the ends of the shell, an improved mechanical connection can be achieved. The flatback web can be used as an integral part of the mechanical structure of the wind turbine blade and may not only be used as a cover.

Therefore, the invention allows to reduce the number and/or the thickness of webs inside the blade as compared to known wind turbine blades.

Preferably, the flatback web comprises one or more layers of fibre material infused with a resin, such as a fibre-reinforced laminate. According to a preferred embodiment, the recess has a width w between 10 mm and 30 mm, preferably between 18 mm and 22 mm. The recess may have a depth d between 50 mm and 300 mm, preferably between 150 mm and 200 mm.

The U-shaped end section of the flatback web may comprise a first arm, such as an outer arm, and an opposed second arm, such as an inner arm, defining the recess therebetween. Each arm may extend from the middle section at an angle of between 45 and 135 degrees, such as between 70 and 110 degrees. In a preferred embodiment, the first arm extends substantially in parallel to the second arm.

The bonded flatback web can be provided with sharp corners which results in better aerodynamic properties.

Furthermore, the blade shell lay-up and infusion cycle times can be reduced, since fibre layers, which are normally required in the shells, can be partially distributed into the flatback web and moulded separately.

According to a preferred embodiment of the invention, the upwind side and/or downwind side shell part comprises a thinned end section. In one embodiment, the thinned end section has a thickness of not more than 50%, such as not more than 25%, of the maximum thickness of the respective shell part. The thinned end section may have a length of 100-300 mm and a thickness of 10-30 mm. In some embodiments, a thickness of the upwind side shell part and a thickness of the downwind side shell part tapers towards the trailing edge end of the respective shell part.

Preferably, such respective thinned end sections of the upwind side shell part and the downwind side shell part are received in the respective recesses of the U-shaped end sections of the flatback web resulting in a lower thickness of the joint.

In particular, by providing an upwind and/or downwind side shell part with a thinned outer surface, the surface of the outer arm of the U-shaped end section can be aligned with the adjacent surface of the shell. Accordingly, a step between the flatback web and the shell at the joint can be avoided.

In a preferred embodiment, a surface of the upwind side shell part, preferably the outer surface of the upwind side shell part and/or a surface of the downwind side shell part, preferably the outer surface of the downwind side shell part, is aligned with an adjacent surface of the U-shaped end section of the flatback web. In some embodiments, a surface of the upwind side shell part, preferably the outer surface of the upwind side shell part and/or a surface of the downwind side shell part, preferably the outer surface of the downwind side shell part, is flush with an adjacent surface of the U-shaped end section of the flatback web, preferably with an outer surface of a respective outer arm of the U-shape end section.

Preferably, the flatback web has a varying geometry over its length. Since the flatback web may be produced as a separate component, it can be embodied in any three-dimensional shape, having optimized aerodynamic properties.

The dimensions of the U-shaped end sections can be optimized such that the bond gap between the shell ends and the recess of the U-shaped end section can be tailored to the structural requirements of the trailing edge, as well as to accurately match aerodynamic requirements at the respective section of the blade.

The outer edges/corners of the flatback web can be tailored to maximize aerodynamic efficiency, e.g. by having a sharp upwind side trailing edge corner and a rounded downwind side trailing edge corner. The desired shape can be easily achieved by providing a mould for the flatback web, which is shaped correspondingly.

In particular, the angle of the U-shaped end section to a middle section of the flatback web can vary along the length of that part that corresponds to the trailing edge of the wind turbine blade when the components are assembled. Thus, in a preferred embodiment, an angle between the U-shaped end section of the flatback web and a middle section of the flatback web, such as an angled between an outer arm of the U-shaped end section and the middle section of the flatback web, varies over the length of the flatback web, in particular wherein the wind turbine blade has a section with a positive flatback angle and a section with a negative flatback angle.

The wind turbine blade can be provided with a section with a positive flatback angle and a section with a negative flatback angle.

According to a preferred embodiment, at least one arm of the U-shaped end section is connected to the upwind or downwind side shell part by a form locked connection, in particular by a tongue and groove connection. In some embodiments, one or both of the shell parts comprise grooves arranged on both sides of the shell part, for example within an inner surface and an outer surface of the shell part. Corresponding tongues provided on one or both the arms of the U-shaped end sections may engage the grooves, thereby forming a form locked connection between the flatback web and the shell parts.

According to this embodiment, the flatback web 50 can be snapped onto the blade. The form locked connection holds the flatback web 50 in position until the adhesive is cured.

The form locked connection can ensure a defined position between flatback web and shell. The form locked connection can also be used to snap the flatback web onto the shells. The form locked connection can hold the components in position until the adhesive is cured.

However, according to another embodiment of the invention, the flatback web is connected with the shell parts by an adhesive only. According to this embodiment of the invention, it is not necessary to apply any form locking means. A flatback web jig which holds the components in position until the adhesive is cured can be used for this embodiment of the invention.

The invention further relates to a wind turbine which comprises a wind turbine blade a described before.

In another aspect, the invention relates to a method for producing a shell part of a wind turbine blade, the method comprising the steps of:

manufacturing an upwind side shell part and a downwind side shell part, manufacturing a flatback web with U-shaped end sections comprising a recess, placing the shell parts upon each other, applying adhesive into the recesses of the end sections of the flatback web and/or onto the shell parts, pushing the flatback web onto the shell parts.

In one embodiment, a method for manufacturing a wind turbine blade comprises the steps of providing an upwind side shell part and a downwind side shell part, each shell part having a leading edge end and a trailing edge end, providing a flatback web with one or more U-shaped end sections, each end section comprising a recess, applying adhesive into the recesses of the respective U-shaped end sections of the flatback web and/or onto the respective trailing edge ends of the upwind side shell part and the downwind side shell part, pushing the flatback web onto the upwind side shell part and the downwind side shell part such that at least part of the upwind side shell part and the downwind side shell part is inserted into the recesses of the respective U-shaped end sections of the flatback web, to form at least part of a trailing edge of the wind turbine blade.

Accordingly, the flatback web may be produced offline with respect to the shell parts in its own mould and then bonded to the shells, wherein the U-shaped end sections ensure a robust mechanical connection.

The U-shaped sections ensure that the geometry of the channels can conform, match and transition the upwind and downwind trailing edge.

According to an embodiment of the invention, the flatback web is pushed onto the shell in a mould which is closed for connecting the shell parts. The flatback web can be bonded onto the blade in a standard blade closing process.

According to this embodiment, the blade may not me moved to another station for applying the flatback web only.

However, according to another embodiment of the invention, the flatback web is pushed onto the shell after the connected shell parts are removed from a mould. According to this embodiment of the invention, bonding of the flatback web is performed after moulding the blade.

This helps to release the blade mould for subsequent shell manufacturing in order to maximize the production volume. Furthermore, bonding the web shell in a separate step, a visual inspection of the open region of the trailing edge is possible.

The flatback web is, according to an embodiment of the invention pushed onto the shell parts by using a flatback web jig.

In another aspect, the present invention relates to a wind turbine blade obtainable by the above-described methods.

The present disclosure further relates to a flatback web jig, which is used to bond the flatback web to the shells.

The flatback web jig comprises at least one wall with a bearing surface for the flatback web and which is pushed onto the flatback web. In particular, the flatback web jig comprises clamps. With the clamps, the wall can be hold under pressure. The desired chordwise pressure ensures an effective bonding and a homogenous distribution of glue.

The shape of the wall may correspond with the shape of the flatback web.

The flatback web jig may also comprise several wall sections. The walls may be embodied as being pivotable.

According to an embodiment of the invention, the flatback web jig is integrated in the mould for producing the blade shells.

The flatback web may be produced by forming a fibre reinforced laminate in a separate mould.

In order to form a recess in the end sections of the flatback web, an insert can be placed in the fibre reinforced laminate which is removed after curing. The insert can embodied as a moulded foam, which is removed after curing. In some embodiments, the insert may comprise a silicone material.

Also, a moulded non-porous plastic insert, e.g. a silicone mould, can be used. Such a mould is reusable.

According to an embodiment of the invention, the insert is covered with at least one fibre layer of the laminate. After curing, this at least one layer cut off in the region of the insert in order to open the recess. This method facilitates the lay-up of the fibre reinforced layers.

Embodiments and features described herein with regard to the wind turbine blade of the present invention may equally apply, and may be combined with, embodiments and features described herein with regard to the method for producing a wind turbine blade of the present invention.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
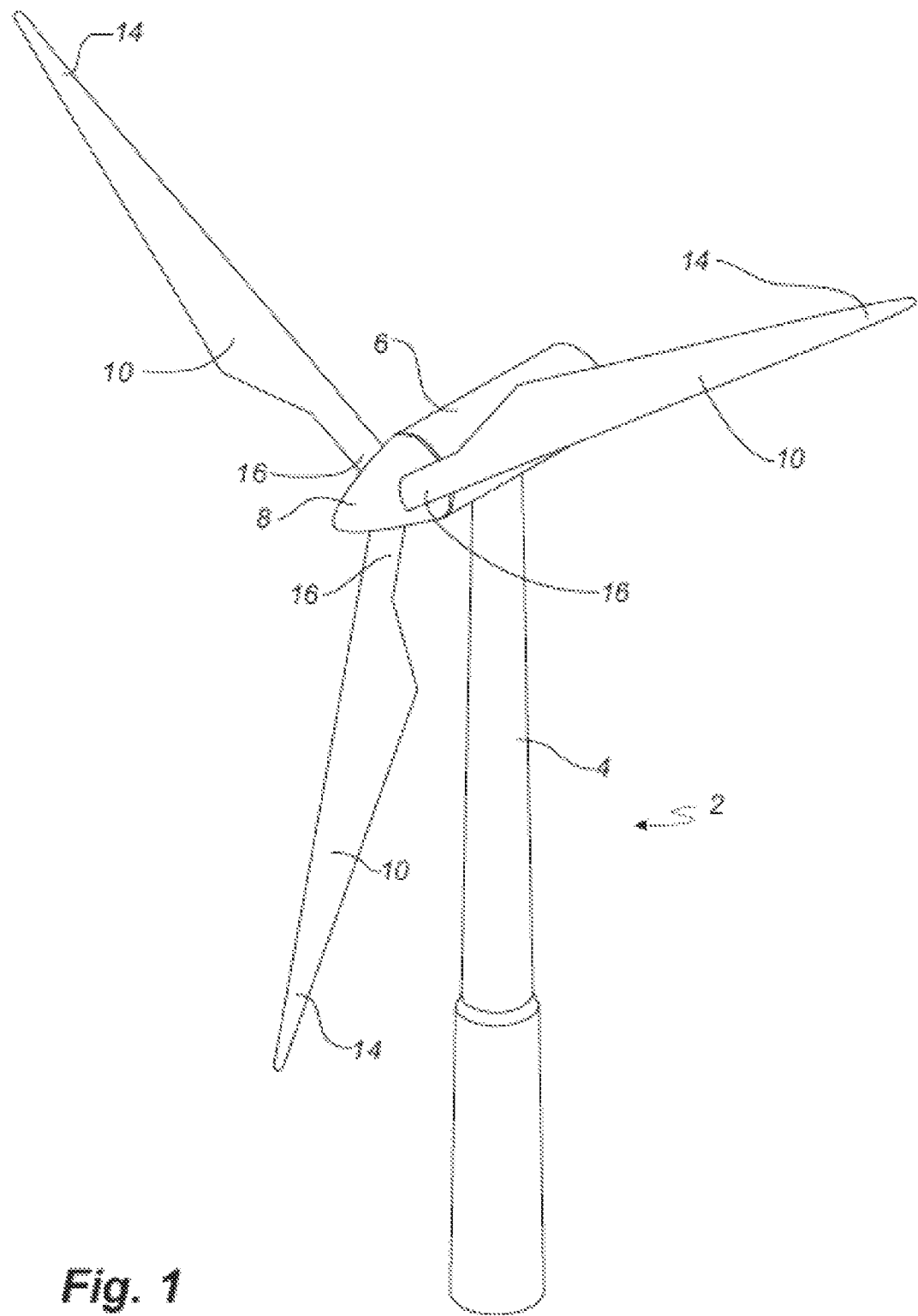
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
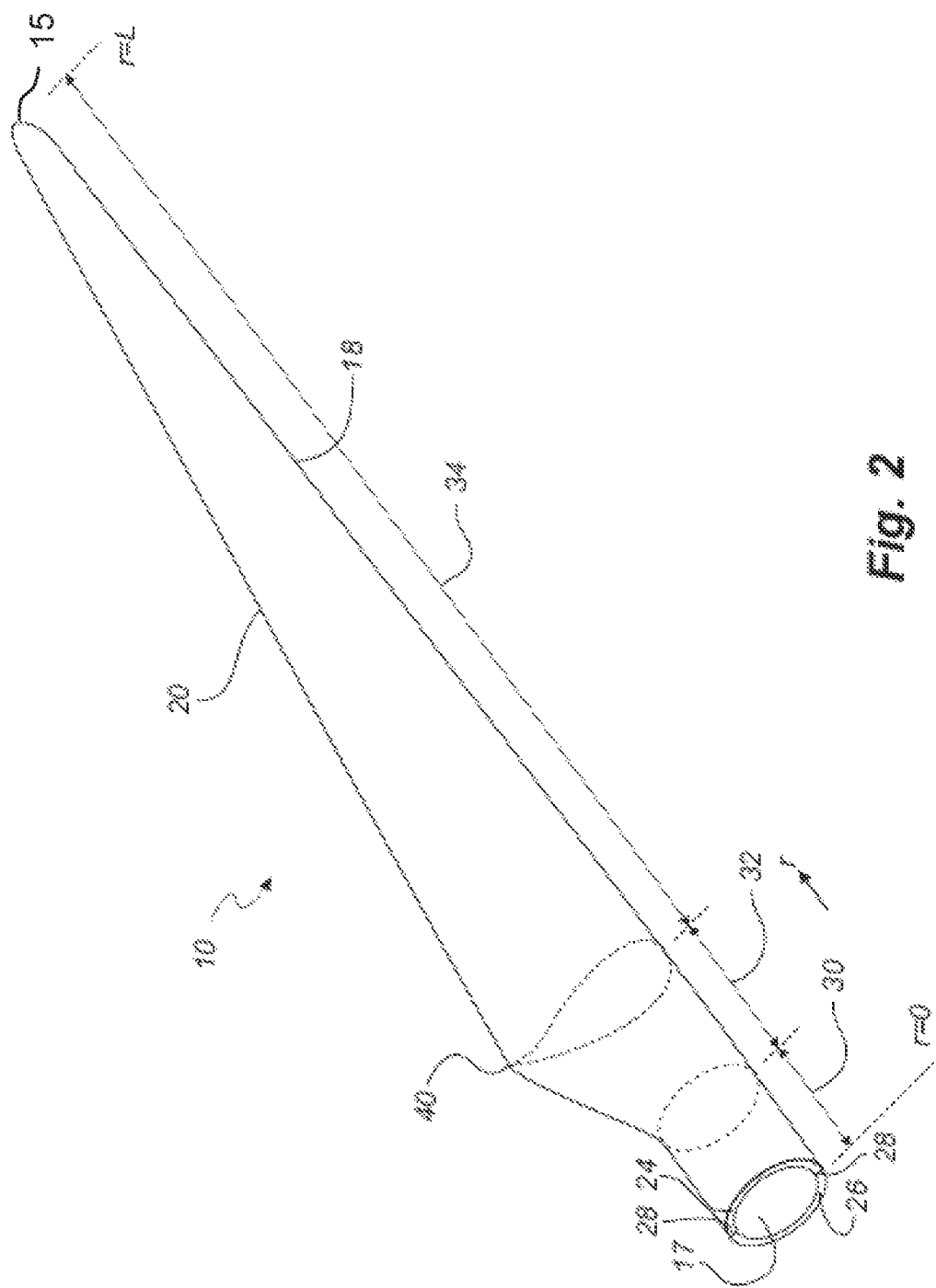
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 have a semi-circular or semi-oval outer cross-sectional shape.

The trailing edge 20 may be embodied as a flatback trailing edge, wherein the edge is flattened in order to achieve better aerodynamic properties. This construction increases the efficiency of the wind turbine blade in comparison with a sharp edge design.

Figure 3:
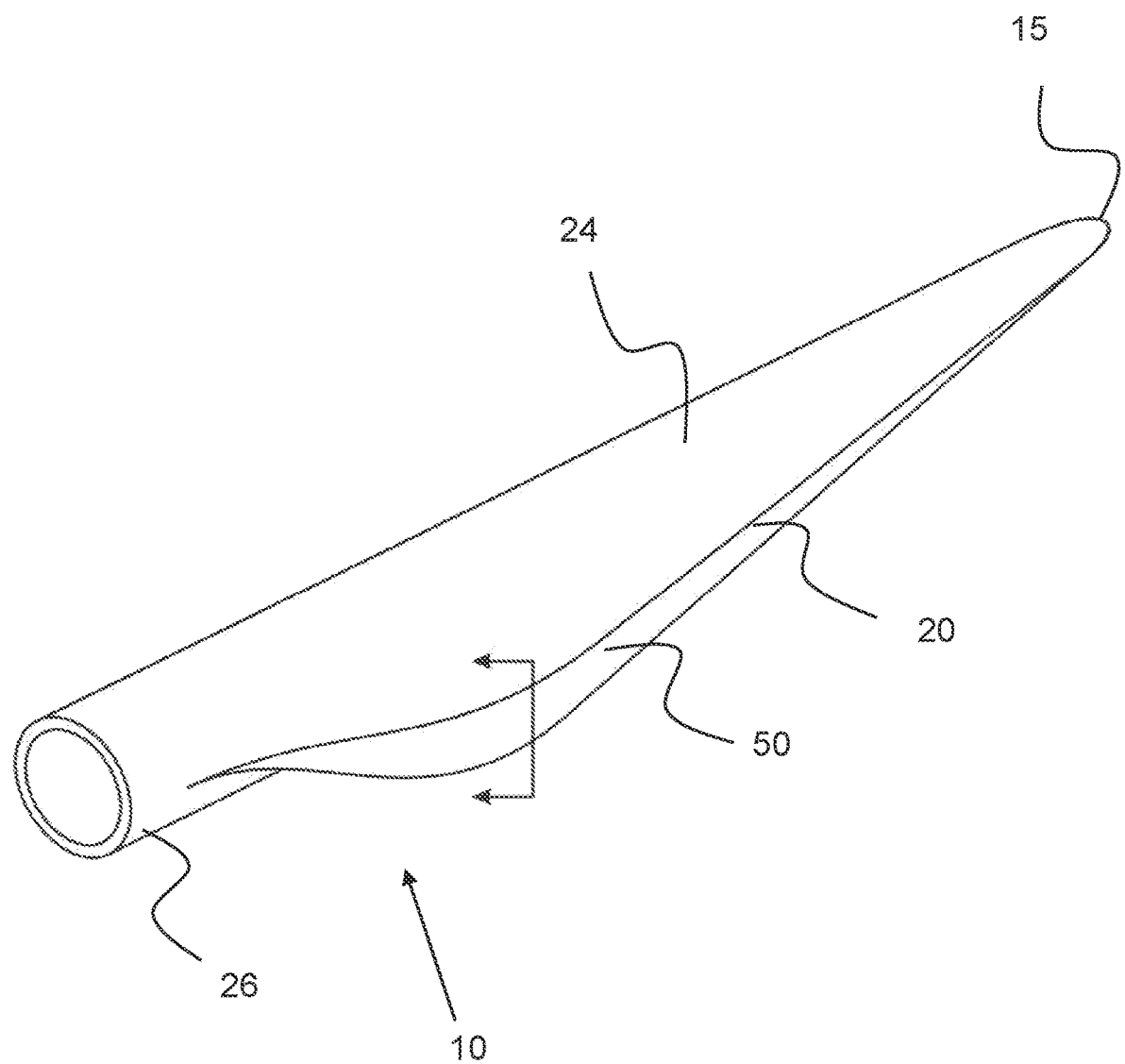
FIG. 3 shows a wind turbine blade with a flatback profile at the trailing edge in more detail.

FIG. 3 shows a wind turbine blade 10 with a flatback profile at the trailing edge in more detail. The trailing edge 20 has a flattened profile. The flattened profile increases the aerodynamic efficiency and also helps to reduce the chord width.

The flatback profile is provided by a flatback web 50 which connects the upwind side shell part 24 with the downwind side shell part 26. Details of this flatback web will be explained in more detail with respect to following drawings.

Figure 4:
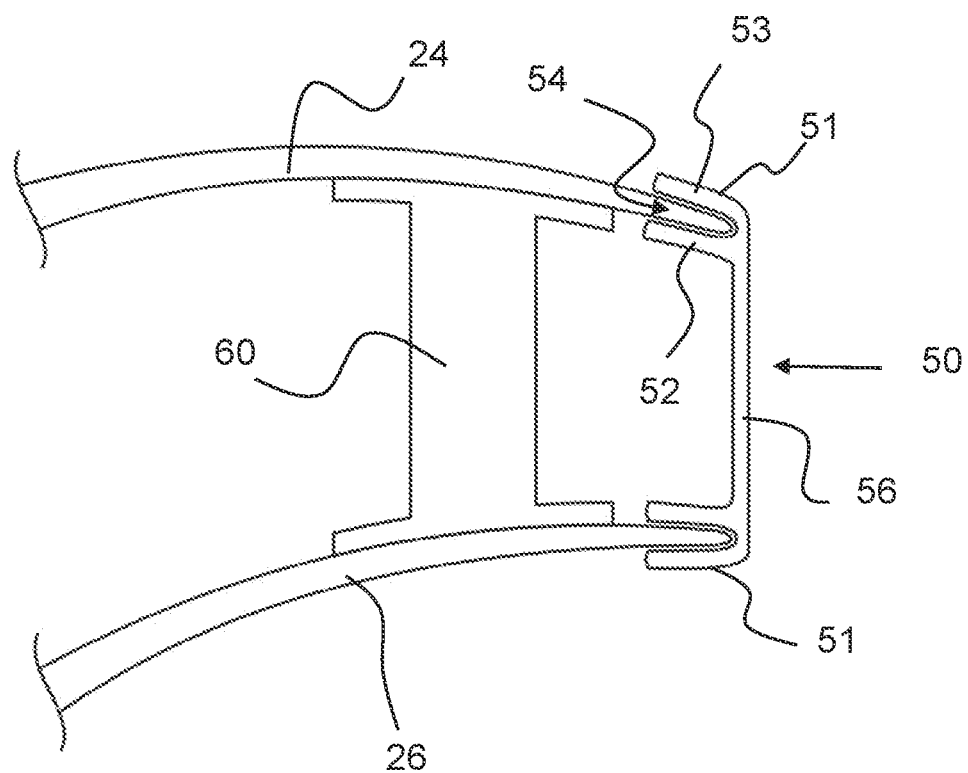
FIG. 4 is a cross sectional view of the trailing edge region of a wind turbine blade.

FIG. 4 is a cross sectional view of the trailing edge region of a wind turbine blade. The upwind side shell part 24 is connected with the downwind side shell part 26 at the trailing edge by a flatback web 50.

The flatback web 50 comprises a middle section 56 which forms the geometry of the trailing edge. In order to bond the flatback web 50 to the shell parts 24, 26, the flatback web 50 comprises U-shaped end sections 51, which are angled with respect to the middle section 56, such that the ends of the shell parts 24, 26 can be inserted into the recesses 54 between the inner arm 52 and the outer arm 53 of the U-shaped end sections 51.

The U-shaped end sections 51 are bonded with an adhesive to the shell parts 24, 26. Accordingly, the shell parts 24, 26 are bonded to the flatback web at its inner and also at its outer surface. This type of joint results in a connection which sustains high forces and sheer loads.

Therefore, the flatback web 50 can be embodied as an integral component of the load bearing structure of the blade.

In this embodiment, there is placed a web 60 between the shell parts 24, 26, being arranged adjacent to the flatback web.

Figure 5:
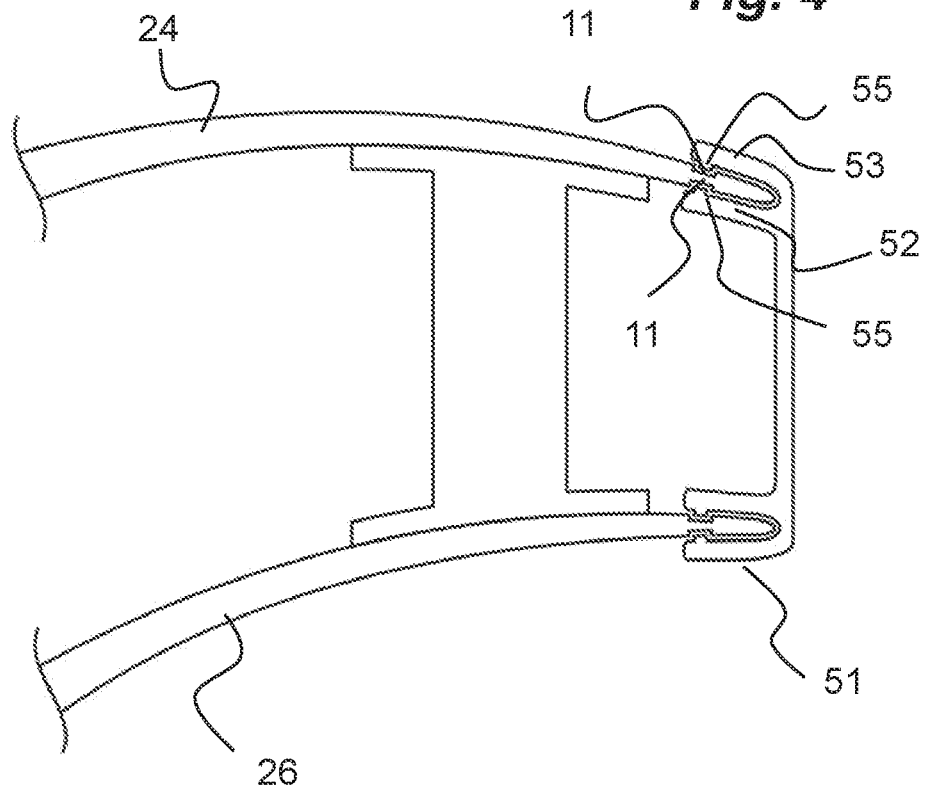
FIG. 5 is a cross sectional view of the trailing edge region of a wind turbine blade of an embodiment with a tongue and groove connection between flatback web and shells.

FIG. 5 is a cross sectional views of the trailing according to another embodiment of the invention, wherein the flatback web 50 is also connected to the shell parts 14, 16 by a tongue and groove connection.

The shell parts 24, 26 comprise grooves 11 being arranged on both sides of the shell. Corresponding tongues 55 at the arms 52, 53 of the U-shaped end sections 51 engage the grooves 11, thereby forming a form locked connection between the flatback web 50 and the shell parts, 24, 26.

According to this embodiment, the flatback web 50 can be snapped onto the blade. The form locked connection holds the flatback web 50 in position until the adhesive is cured.

However, according to this embodiment of the invention, it is necessary to provide a shell part 24, 26 with a groove 11.

Figure 6:
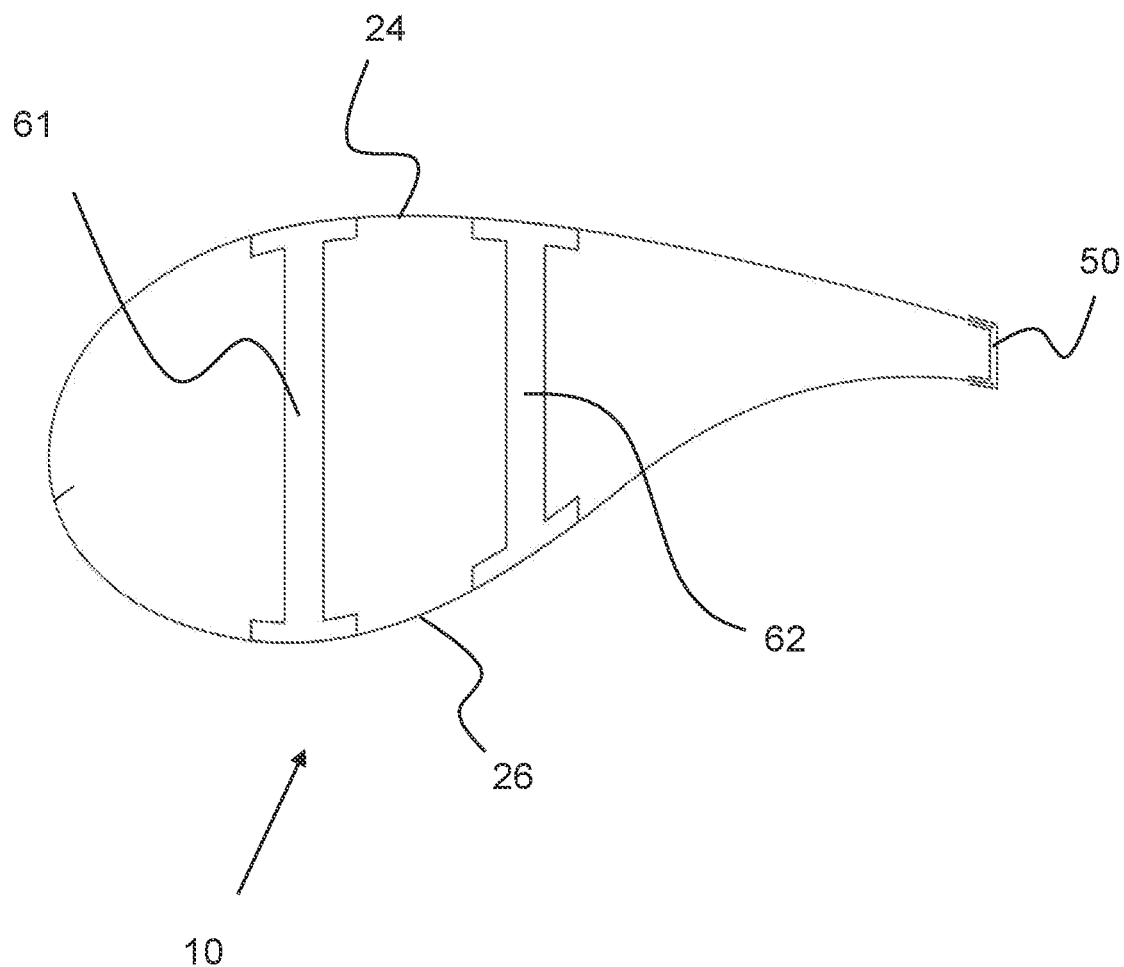
FIG. 6 is a cross sectional view of an entire wind turbine blade.

FIG. 6 is a cross sectional view of an entire wind turbine blade 10. According to this embodiment of the invention, the shell parts 24, 26 are connected in the region of the trailing edge by the flatback web 50 only. Further webs 61, 62, which couple the shell parts 24, 26, are spaced apart from the trailing edge.

This is possible, since the flatback web 50 is an integral part of the load bearing structure of the wind turbine blade 10.

As the geometry transitions towards the tip, the internal flanges 61, 62 may taper away and the flatback web 50 flange may taper out.

Figure 7:
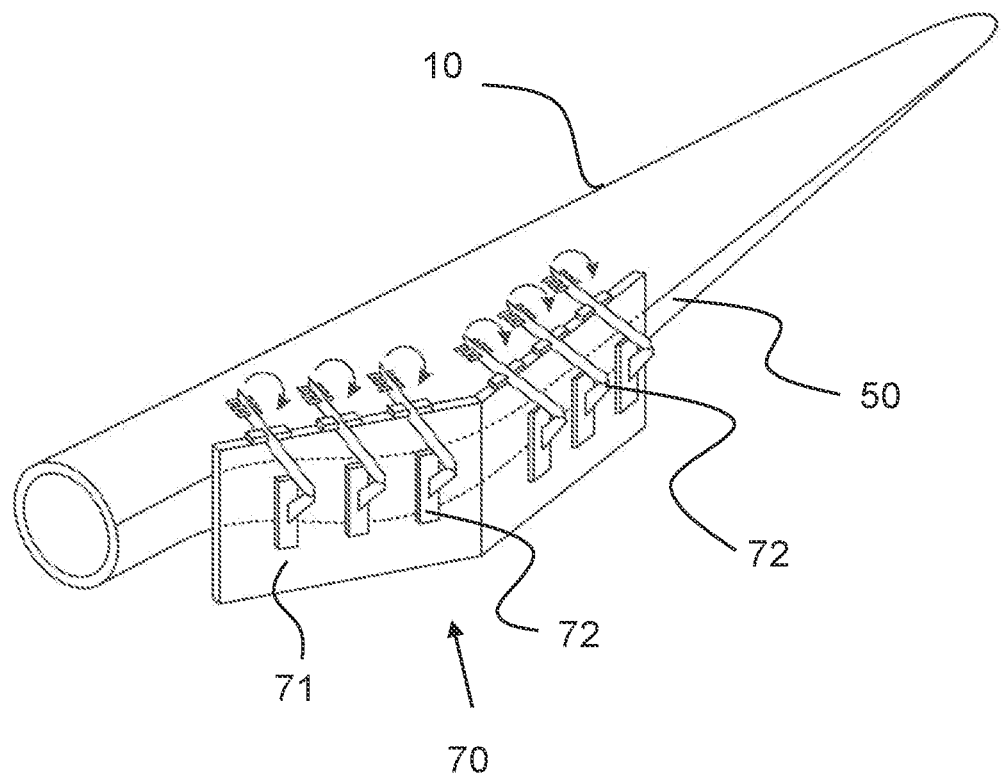
FIG. 7 is a schematic illustration of the use of a flatback web jig.

FIG. 7 is a schematic illustration of the use of a flatback web jig 70. The flatback web jig comprises a wall 71, which serves as a bearing surface for the flatback web 50.

The wall 71 can be divided into segments. The wall 71, respectively each wall section, is pivotable so that the wall can be easily tilted to the flatback web 50.

After tilting the wall 71, clamps 72 may be tightened in order to achieve the desired chord pressure to squeeze out the glue and to achieve the desired glue distribution.

Figure 8:
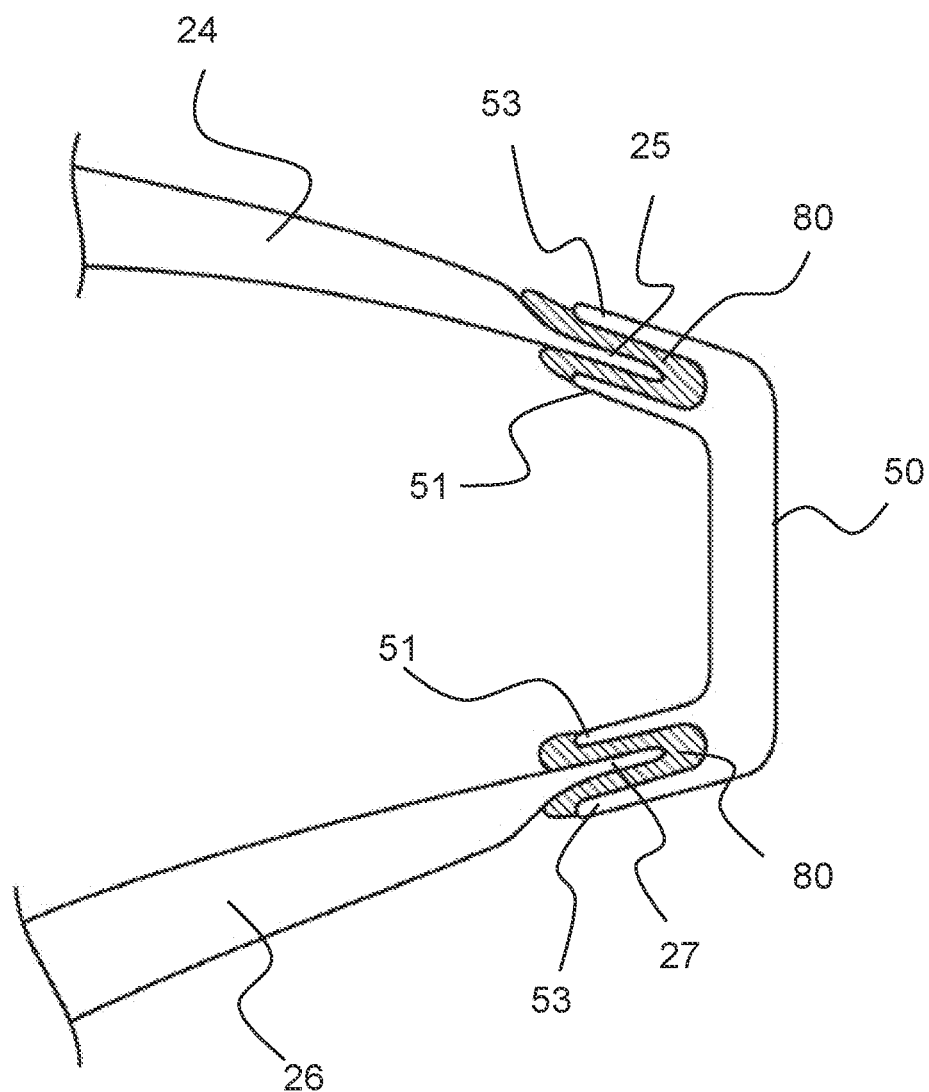
FIG. 8 is a cross sectional view of the trailing edge region of a wind turbine blade according to an embodiment of the invention, wherein the edge of the shell comprises a flattened section in the region of the joint, FIG. 9 in an illustration how the flatback angle varies over the length of the blade.

FIG. 8 is a cross sectional views of the trailing edge region of a wind turbine blade according to an embodiment of the invention, wherein the edge of the shell comprises a flattened section in the region of the joint.

The shell parts 24, 26 each comprise a thinned end section 25, 27, wherein the outer surface of the shell is thinned.

The U-shaped end sections 51 of the flatback web 50 are bonded by an adhesive 80 to the thinned end sections 25, 27 of the shell. Due to the thinned surface, a step on the outer surface between the outer arm 53 of the flatback web 50 and the adjacent shell can be avoided. The outer arm 53 is rather aligned with the adjacent surface of the shell.

Figure 9:
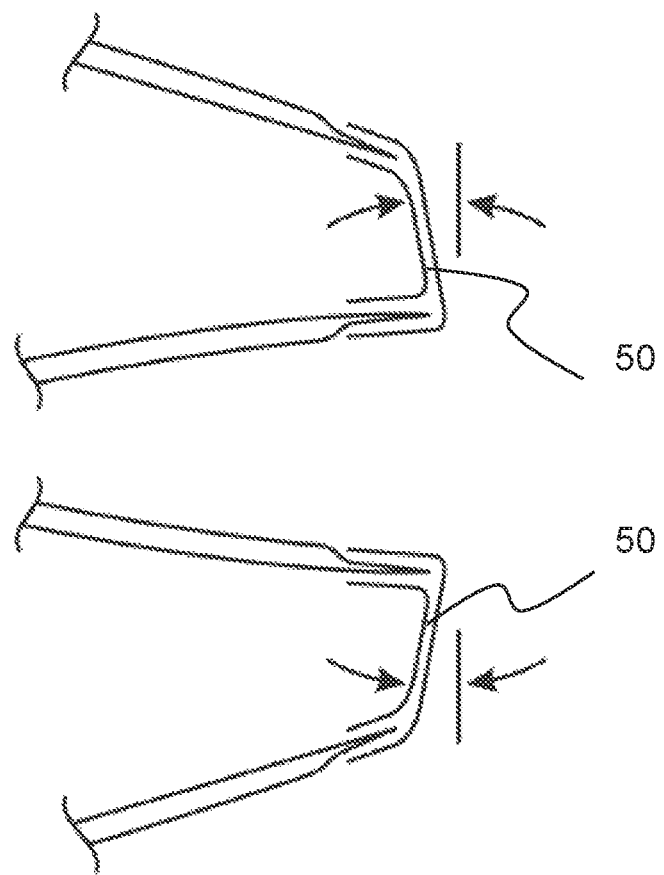

FIG. 9 in an illustration how the flatback angle may vary over the length of the blade. Since the flatback web 50 can be provided with any desired geometry, a flatback trailing edge with a positive flatback angle in one section and a negative flatback angle in another section can be easily provided.

Also the width of the flatback web 50 may vary over its length. In particular, the flatback web 50 may also run out to the tip and/or to the root end of the blade.

Figure 10:
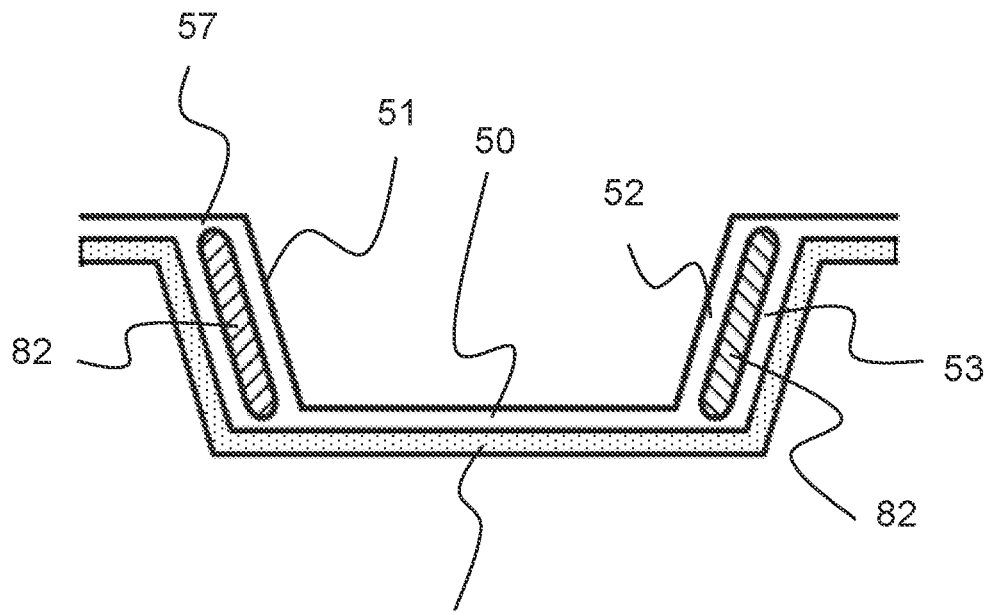
FIG. 10 is a cross sectional view of mould for manufacturing a flatback web.

FIG. 10 is a cross sectional view of mould 81 for manufacturing a flatback web 50. The mould 50 can be provided with a three-dimensional shape which is a negative of the shape of the flatback web 50.

Fibre (e.g. glass or carbon fibres) layers are inserted into the mould 81. Then a resin is injected and cured to form a laminate.

In order to provide a flatback web 50 with U-shaped end sections 51, an insert 82 is placed between the fibre layers.

According to this embodiment of the invention, the insert 82 is covered by at least one laminate layer 57. This procedure facilitates the application of the fibre layers, since the fibre layers can be drawn to the edge of the mould 81.

After curing of the resin, the at least one laminate layer 57, covering the insert 82, is cut off and the insert 82 is removed.

Figure 11:
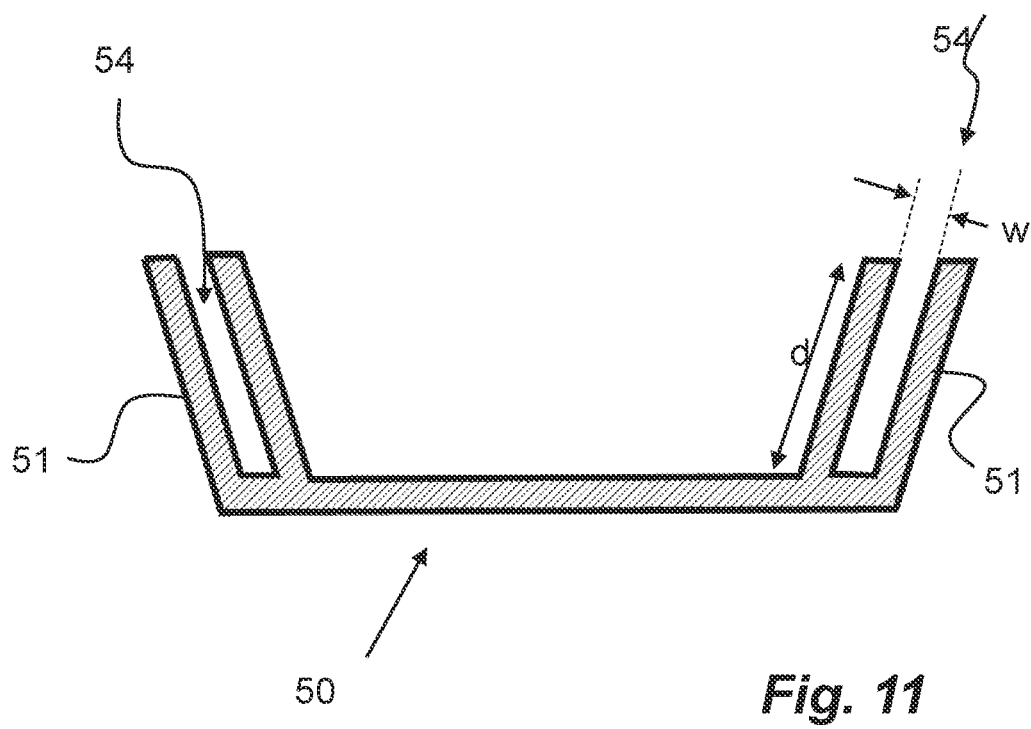
FIG. 11 shows the flatback web after removing from the mould.

As shown in FIG. 11, a flatback web 50 comprising angled U-shaped end sections 51 each comprising a recess 54 for bonding to the shell parts is produced.

According to a preferred embodiment of the invention, the recess has a width w between 10 mm and 30 mm, preferably between 18 mm and 20 mm. The recess may have a depth d between 50 mm and 300 mm, preferably between 150 mm and 200 mm.

Figure 12:
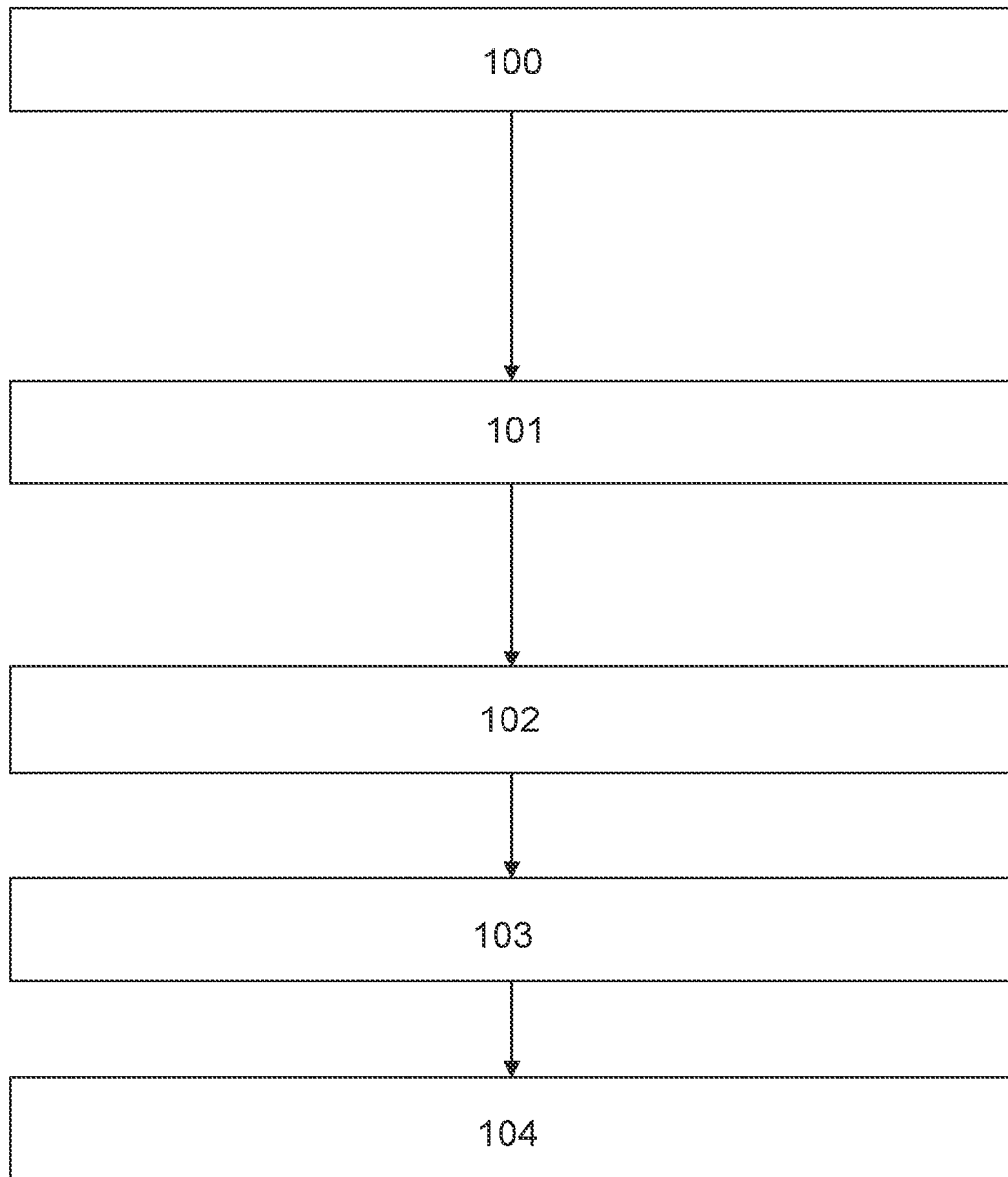
FIG. 12 is a flowchart showing the steps of producing a wind turbine blade according to an embodiment of the invention.

FIG. 12 is a flowchart showing the steps of producing a wind turbine blade according to an embodiment of the invention.

First, an upwind side shell part and a downwind side shell part are manufactured in a mould 100.

A flatback web with U-shaped end sections comprising a recess is manufactured offline as a separate component 101.

The shell parts are placed in a mould upon each other 102.

In order to bond the flatback web to the shell parts, adhesive is applied into the recesses of the end sections of the flatback web and/or onto the end sections of the shell parts 103.

Then, the flatback web is pushed onto the shell parts 104. For this step, a flatback web jig might be used as described before.

After curing the adhesive, a wind turbine blade with a flatback profile is produced, wherein the flatback web is an integral part of the load bearing structure.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
11 groove
14 blade tip
15 tip end
16 blade root
17 root end
18 leading edge
20 trailing edge
24 first blade shell part (upwind/pressure side shell part)
25 thinned end section of the blade
26 second blade shell part (downwind/suction side part)
27 thinned end section of the blade
28 bond lines/glue joints
30 root region
32 transition region
34 airfoil region
40 shoulder
50 flatback web
51 U-shaped end section
52 inner arm
53 outer arm
54 recess
55 tongue
56 middle section
57 laminate layer
60 web
61 web
62 web
70 flatback web jig
71 wall
72 clamp
80 adhesive
81 mould for producing flatback web
82 insert
100 Manufacturing an upwind side shell part and a downwind side shell part
101 Manufacturing a flatback web with U-shaped end sections comprising a recess
102 Placing the shell parts upon each other
103 Applying adhesive into the recesses of the end sections of the flatback web and/or onto the shell parts
104 Pushing the flatback web onto the shell parts

The invention claimed is:

1. A wind turbine blade, comprising:
an upwind side shell part;
a downwind side shell part;
a leading edge and a trailing edge; and
a flatback web being arranged at the trailing edge, which couples the upwind side shell part with the downwind side shell part, wherein the flatback web comprises at least one U-shaped end section with a recess, into which at least part of the upwind side shell part and/or at least part of the downwind side shell part is inserted and bonded to the U-shaped end section, and wherein the flatback web extends vertically with respect to a cross-section of the wind turbine blade.

2. The wind turbine blade according to claim 1, wherein the flatback web comprises a first U-shaped end section at a first end, and a second U-shaped end section at a second end.

3. The wind turbine blade according to claim 1, wherein a thickness of the upwind side shell part and/or a thickness of the downwind side shell part tapers towards the trailing edge of the respective shell part.

4. The wind turbine blade according to claim 1, wherein a surface of the upwind side shell part and/or a surface of the downwind side shell part is aligned with an adjacent surface of the U-shaped end section of the flatback web.

5. The wind turbine blade according to claim 1, wherein the flatback web has a varying geometry over its length.

6. The wind turbine blade according to claim 1, wherein an angle between the U-shaped end section of the flatback web and a middle section of the flatback web varies over the length of the flatback web, in particular wherein the wind turbine blade has a section with a positive flatback angle and a section with a negative flatback angle.

7. The wind turbine blade according to claim 1, wherein the U-shaped end section comprises a first arm and a second arm, wherein at least one of the arms of the U-shaped end section is connected to the upwind or downwind side shell part by a form locked connection, in particular by a tongue and groove connection.

8. The wind turbine blade according to claim 1, wherein the flatback web comprises a fibre reinforced laminate.

9. A wind turbine, comprising a wind turbine blade according to claim 1.

10. A method for manufacturing a wind turbine blade, the method comprising the steps of:
- providing an upwind side shell part and a downwind side shell part, each shell part having a leading edge end and a trailing edge end;
- providing a flatback web with one or more U-shaped end sections, each end section comprising a recess;
- applying adhesive into the recesses of the respective U-shaped end sections of the flatback web and/or onto the respective trailing edge ends of the upwind side shell part and the downwind side shell part; and
- pushing the flatback web onto the upwind side shell part and the downwind side shell part such that at least part of the upwind side shell part and the downwind side shell part is inserted into the recesses of the respective U-shaped end sections of the flatback web, to form at least part of a trailing edge of the wind turbine blade, wherein the flatback web extends vertically with respect to a cross-section of the wind turbine blade.

11. The method according to claim 10, wherein the flatback web is pushed onto the shell parts in a mould which is closed for connecting the shell parts.

12. The method according to claim 10, wherein the flatback web is pushed onto the shell after the upwind side shell part and the downwind side shell part have been connected and removed from a mould.

13. The method according to claim 10, wherein the flatback web is pushed onto the shell parts by using a flatback web jig, which comprises a wall with a bearing surface for the flatback web and which is pushed onto the flatback web, in particular by using clamps.

14. The method according to claim 10, wherein the flatback web is produced comprising a step of forming a fibre reinforced laminate in a mould.

15. The method according to claim 14, wherein the recess of the U-shaped end section of the flatback web is produced by placing an insert in or on the fibre reinforced laminate, wherein the insert is removed after curing.

* * * * *